US010691679B2

(12) United States Patent
Paparizos et al.

(10) Patent No.: US 10,691,679 B2
(45) Date of Patent: Jun. 23, 2020

(54) PROVIDING QUERY COMPLETIONS BASED ON DATA TUPLES

(75) Inventors: Stelios Paparizos, San Jose, CA (US); David James Gemmell, Danville, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/008,046

(22) Filed: Jan. 18, 2011

(65) Prior Publication Data

US 2012/0185507 A1 Jul. 19, 2012

(51) Int. Cl.
*G06F 16/00* (2019.01)
*G06F 16/242* (2019.01)

(52) U.S. Cl.
CPC ........ *G06F 16/2428* (2019.01); *G06F 16/243* (2019.01)

(58) Field of Classification Search
USPC .......................... 707/713, 501, 508, 728, 705
IPC ...................................................... G06F 16/00
See application file for complete search history.

(56) References Cited

U.S. PATENT DOCUMENTS

| | | | |
|---|---|---|---|
| 6,647,383 B1 | 11/2003 | August et al. | |
| 7,403,938 B2 * | 7/2008 | Harrison et al. | |
| 7,539,656 B2 | 5/2009 | Fratkina et al. | |
| 8,156,109 B2 * | 4/2012 | Kamvar et al. | ................ 707/713 |
| 8,250,058 B2 * | 8/2012 | Fish | ........................ G06Q 30/00 707/708 |
| 2002/0055894 A1 | 5/2002 | Hyder | |
| 2004/0073431 A1 | 4/2004 | Galanes et al. | |
| 2006/0259479 A1 | 11/2006 | Dai | |
| 2008/0005075 A1 | 1/2008 | Horvitz et al. | |

OTHER PUBLICATIONS

Horchani, et al., "A Platform for Output Dialogic Strategies in Natural Multimodal Dialogue Systems", Retrieved at << http://citeseerx.ist.psu.edu/viewdoc/download?doi=10.1.1.96.3984&rep=rep1&type=pdf >>, 11th International Conference on Intelligent User Interfaces, Jan. 28-31, 2007, pp. 10.

(Continued)

*Primary Examiner* — Yicun Wu
(74) *Attorney, Agent, or Firm* — Goff IP Law PLLC; Jared Goff

(57) ABSTRACT

Data, such as product data or airline flight data, is represented using structured data tuples, tables, or as data with related metadata and tags, and stored by a search engine. Partial queries are received by the search engine from a user and are used to generate a dialog between the search engine and the user. The dialog may include suggested query completions for the partial queries that correspond to a schema associated with the data tuples. The suggested query completions may be determined using attribute combinations of attributes and attribute values, or metadata and tags associated with the data tuples, including known synonyms and misspellings. The user may interact with the query completions in the dialog, and the search engine may revise the dialog and the query completions according to the interactions. A user may query data tuples without knowing the schema used by the underlying data structures.

20 Claims, 7 Drawing Sheets

(56) References Cited

OTHER PUBLICATIONS

Sadek, David, "Design Considerations on Dialogue Systems: From Theory to Technology The Case of Artimis", Retrieved at << http://www.classes.cs.uchicago.edu/archive/2004/fall/35900-1/papers/sadek.Artimis.pdf >>, In Proceedings of the ESCA Workshop on Interactive Dialogue in Multimodal Systems, Jun. 22-25, 1999, pp. 15.
Bell, et al., "Real-time Handling of Fragmented Utterances", Retrieved at << http://citeseerx.ist.psu.edu/viewdoc/download?doi=10.1.1.18.6960&rep=rep1&type=pdf >>, In Proceedings of the NAACL Workshop on Adaption in Dialogue Systems, 2001, pp. 7.
Chai, et al., "Natural Language Sales Assistant—A Web-based Dialog System for Online Sales", Retrieved at << http://citeseerx.ist.psu.edu/viewdoc/download?doi=10.1.1.92.9732&rep=rep1&type=pdf >>, Proceedings of the Thirteenth Innovative Applications of Artificial Intelligence Conference, Aug. 7-9, 2001, pp. 8.

\* cited by examiner

PROVIDING QUERY COMPLETIONS BASED ON DATA TUPLES

BACKGROUND

Many search engines offer suggested queries to a user as a user enters a query into a search box. For example, a user may enter the character "a" into the search box, and the search engine may begin to offer suggested queries that begin with the character "a". Typically, these suggested queries are based on queries that have been submitted to a search engine in the past either by the user or by other users. These past queries may be taken from various sources, including data logs, such as query logs, search logs, toolbar logs, etc.

While using past queries to suggest current queries is useful, there are many drawbacks associated with such an approach. For example, using past queries limits the queries that are suggested to queries that have been suggested in the past. Thus, if a user is searching for a new product or topic, the queries that are suggested may not reflect the query that the user is entering. In addition, as more and more websites rely on structured data, the suggested queries may not take advantage of the schema that is defined by the attribute and attribute values that make up the structured data. Such drawbacks may lead to a diminished search experience for users.

SUMMARY

Data, such as product data or airline flight data, is represented using structured data tuples, tables, or as data with related metadata and tags, and stored by a search engine. Partial queries are received by the search engine from a user and are used to generate a dialog between the search engine and the user. The dialog may include suggested query completions for the partial queries that correspond to a schema associated with the data tuples. The suggested query completions may be determined using attribute combinations of attributes and attribute values, or metadata and tags associated with the data tuples, and including known synonyms and misspellings. The user may interact with one or more of the query completions in the dialog, and the search engine may revise the dialog and the query completions according to the interactions. In this way, a user may query data tuples without knowing the schema used by the underlying data structures.

In an implementation, first query data is received at computing device through a network. A first plurality of query completions is determined based on the first query data and a set of attribute combinations associated with data tuples. A subset of the first plurality of query completions is provided, and second query data is received. A second plurality of query completions is determined based on the first query data, the second query data and the set of attribute combinations by the computing device. A subset of the second plurality of query completions is provided by the computing device through the network.

In an implementation, a set of data tuples is received at a computing device. Each data tuple may include attributes and each attribute may have one or more attribute values. A set of attribute combinations is generated based on the attributes and the corresponding one or more attribute values by the computing device. Query data is received at the computing device. Query completions are determined for the query data using the set of attribute combinations by the computing device. A subset of the determined query completions is provided by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
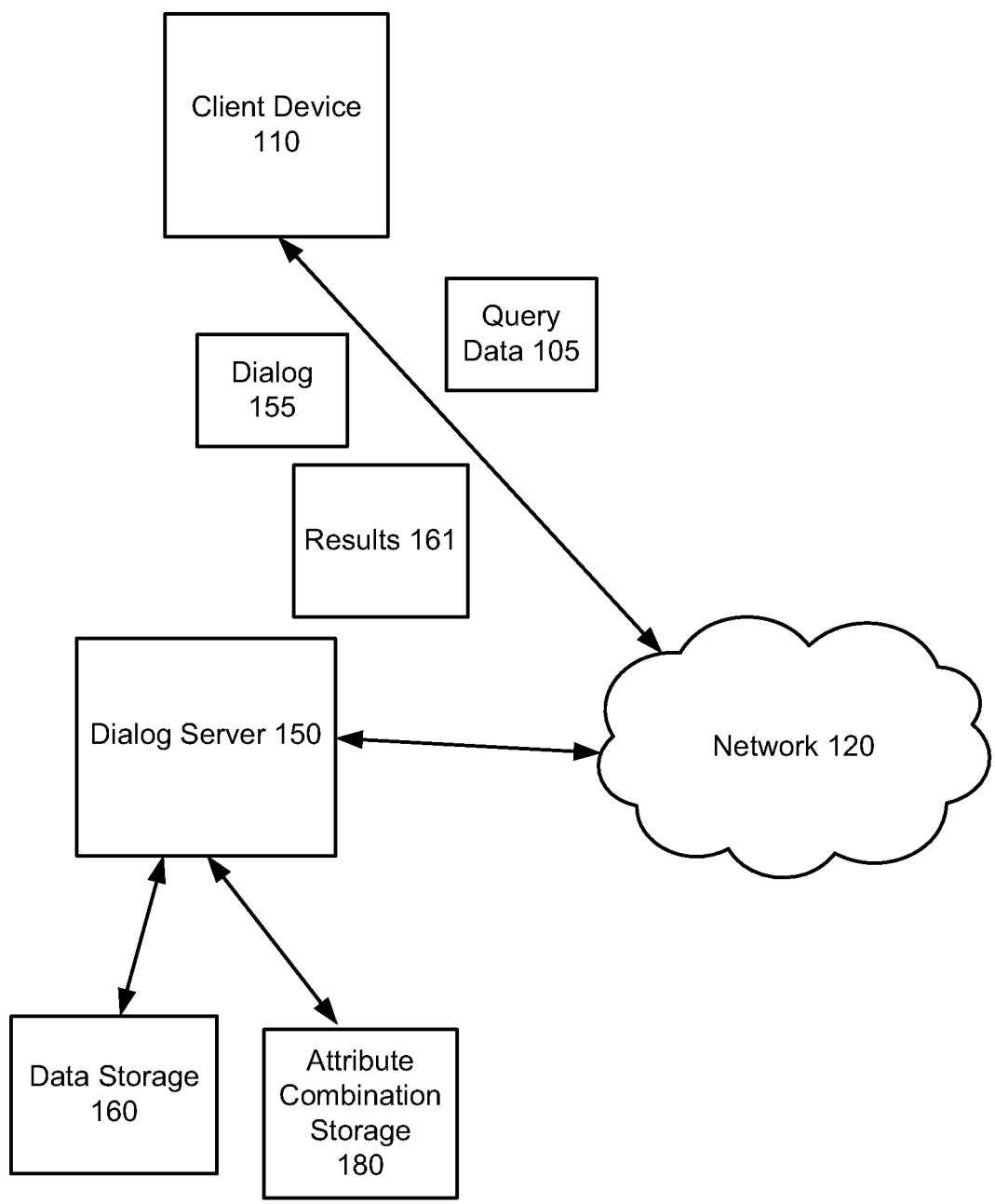
FIG. 1 is an illustration of an example environment using a dialog server.

FIG. 1 is an illustration of an example environment 100 using a dialog server 150. The environment 100 may include a client device 110 and the dialog server 150 in communication with one another through a network 120. The network 120 may be a variety of network types including the public switched telephone network (PSTN), a cellular telephone network, and a packet switched network (e.g., the Internet).

In some implementations, the client device 110 may include a desktop personal computer, workstation, laptop, PDA (personal digital assistant), cell phone, or any WAP (wireless application protocol) enabled device or any other computing device capable of interfacing directly or indirectly with the network 120. A client device 110 may be implemented using a general purpose computing device such as the computing device 700 described with respect to FIG. 7, for example. While only one client device 110 is shown, it is for illustrative purposes only; multiple client devices may be supported.

The client device 110 may generate and provide query data 105 to the dialog server 150. The query data 105 may include one or more characters of a query. The query may be a query that is intended by a user of the client device 110. For example, a user may intend to submit the query "Sony digital camera" to the dialog server 150, and may begin by typing the character "s" into a user interface element displayed to the user by the client device 110. Rather than wait for the user to complete the query "Sony digital camera", the client device 110 may provide the query data 105 to the dialog server 150. The query data 105 in this example would be the character "s". As the user continues to complete the query "Sony digital camera", the client device 110 may provide the additional characters of the query to the dialog server 150.

The dialog server 150 may be part of a general search engine. For example, the dialog server 150 may receive the query data 105 corresponding to queries intended by users for the search engine. Alternatively, or additionally, the dialog server 150 may be part of a website associated with a merchant or other service provider.

The dialog server 150 may receive the query data 105, and may use the received query data 105 to generate or determine what is referred to herein as a "dialog". As will be described further below, the dialog 155 is referred to as a dialog because the information included in the dialog 155 may be updated as a user provides additional query data 105, thus creating a dialog between the user and the dialog server 150.

In some implementations, a dialog 155 may include one or more possible query completions for the query data 105. For example, for query data 105 including the characters "ch", possible query completions may include queries that begin with the characters "ch". In some implementations, the query completions are not strictly limited to queries that include the query data 105 but may include synonyms, homonyms, popular misspellings, or known related words or phrases of queries that include the query data 105. For example, if the query data 105 is the string "tv", one or more query completions provided in the dialog 155 may include "television", "monitor", "plasma", "LCD", and "LCD Television". Moreover, the information or data included in the dialog 155 is not limited to text or query completions. For example, a dialog 155 may include images such as charts or other graphics.

Continuing the example of the query "Sony Digital Camera" described above, after the user enters the query data 105 including the character "s", a dialog 155 may be displayed to the user with the query completion "Sony Digital Camera." Alternatively or additionally, the query completions included in the dialog 155 may be partial query completions and may include other terms or phrases associated with the character "s", such as "Sony" and "Samsung." The user may then select the term "Sony" and may continue to enter query data 105 including the character "d". Accordingly, the dialog 155 may be updated to include the query completion "Digital Camera". The user may then select "Digital Camera" to complete the query "Sony Digital Camera."

In some implementations, the query completions included in the dialog 155 may be expressed in the form of a question or a suggestion. For example, for query data 105 that includes the character string "so", the query completion may comprise the question "Are you interested in Sony Televisions or Sony Playstation?"

In some implementations, the query completions may include what are referred to herein as "concrete" and "abstract" query completions. An abstract query completion may be a query completion that includes one or more tokens through which a user may provide additional information requested by the query completion. For example, the abstract query completion for the query data 105 character string "tv" may be "I am interested in televisions of <BRAND>, <TYPE>, that are at least <SIZE>". The user may then interact with the abstract query suggestion by selecting one or more of the tokens and providing data corresponding to the selected one or more tokens. In contrast, a concrete query completion may include no tokens.

The generated dialog 155, including the one or more query completions, and other included data, may be provided to the client device 110 through the network 120, where the dialog 155 may be displayed to the user who provided the query data 105. For example, the generated query completions may be displayed to the user in a drop-down box proximate to a user interface element that was used to enter the query data 105.

The user may view the displayed dialog 155 and may interact with the displayed dialog 155. The interactions with the displayed dialog 155 may include selecting a query completion included in the displayed dialog 155. Where the dialog 155 includes one or more abstract query completions, the interactions with the displayed dialog 155 may include selecting the abstract query completion and providing data corresponding to one or more tokens of the abstract query completion.

The indicators of any interactions with the dialog 155 may be provided to the dialog server 150 by the client device 110. The dialog server 155 may revise or update the query data 105 based on the interactions and may update the dialog 155 based on the refined query data. The updated dialog 155 may then be provided to the client device 110 where it may be displayed to the user. Alternatively, or additionally, the dialog server 150 may generate a set of results 161 according to the refined query data. The results 161 may be provided to the client device 110 along with the revised dialog 155.

In some implementations, each of the results 161 may indicate a tuple of data from a data storage 160. The data tuples may be structured data tuples and each data tuple may comprise a collection of attributes with each attribute having an associated attribute value. Data tuples are commonly used to describe a variety of products and services, such as consumer items or products, and airline flights. While structured data tuples are used to describe the type of data stored in the data storage 160, the data is not limited to structured data tuples. The data in the data storage 160 may include tables, tags, metadata, or any other type of data or data structure.

For example, data tuples may be used to represent the television inventory of an electronics retailer. Typical attributes associated with the televisions may include "brand", "type", "size", "price", etc. Further, each television may have one or more attribute values associated with one or more of the attributes. Because every attribute may not be applicable to each television, each attribute may not have a corresponding attribute value for each product. In some implementations, the data tuples may be stored as a table or database by the data storage 160. For example, each data tuple may correspond to a row of a table. However, other data structures may be used. An example table of data tuples for four televisions is given in Table 1:

TABLE 1

| Television ID | TYPE | BRAND | SIZES | PRICE |
|---|---|---|---|---|
| 1 | LCD | SONY | 46 inch | $700 |
| 2 | PLASMA | SAMSUNG | 42 inch | $500 |
| 3 | LCD | SAMSUNG | 32 inch | $300 |
| 4 | PLASMA | SONY | 50 inch | $999 |

As can be appreciated, the well defined attributes and attribute values of the data tuples can be used to create a schema that may be used to query the data tuples of the data storage 160. For example, Table 1 can be queried for Sony 42 inch televisions using the query "<BRAND=SONY> AND <SIZE=42 inch>". However, users are typically unaware of the schema used by the data tuples, and consequently the queries submitted by users may not match against the attribute and attribute values used by the data tuples. For data that is not represented using data tuples, a schema can similarly be created based on fields in a table, tags associated with the data, or metadata associated with the data, for example.

Accordingly, the dialog server 150 may determine one or more query completions for a dialog 155 based on the query data 105 and according to the data tuples from the data storage 160. Thus, the dialog 155 may suggest query completions to the user that are based the query data 105, and that also correspond to the attribute and attribute values that form the data tuples.

In some implementations, the dialog server 150 may determine a plurality of query completions based on the query data 105 using a set of attribute combinations. Each set of attribute combinations may represent one or more possible combinations of attribute and attribute values from the data storage 160 and may be stored and maintained by the dialog server 150 in an attribute combination storage 180. The sets of attribute combinations may be generated based on the attribute and attribute values of the data tuples, and may be used by the dialog server 150 to determine attribute and attribute values of the data tuples that match or correspond to the query data 105. In some implementations, the sets of attribute combinations may be implemented using one or more rules, patterns, or grammars. The attribute combinations may further have one or more probabilities or confidence values that may be used to select one or more of the attribute combinations to apply to the query data 105.

In some implementations, the dialog server 150 may use the sets of attribute combinations to determine all (or some) possible valid combinations of attributes and attribute values from the data storage 160 that match or partially match the query data 105. The attributes and attribute values that match or partially match the query data 105 may be used to determine a plurality of query completions for the query data 105. A subset of the determined plurality of query completions may be provided to the client device 110 by the dialog server 150 in a dialog 155.

In some implementations, the attribute combinations in the attribute combination storage 180 may result in query completions for products that do not exist in the data storage 160, but whose existence is realistic based on the attributes and attribute values of other items or products in the data storage 160. For example, while there is no product in Table 1 corresponding to a "42 inch Sony Television", such a query completion may be a plausible query completion for the partial query "42" based on the attributes and attributes values of the other items in the data storage 160. However, query completions may not be suggested where the probability of an item with a corresponding combination of attributes and attribute values is low or non-existent. For example, the query completion "4200 inch Sony Television" may not be an appropriate query completion because no items or products having a size of 4200 inches exist in the data storage 160.

Figure 2:
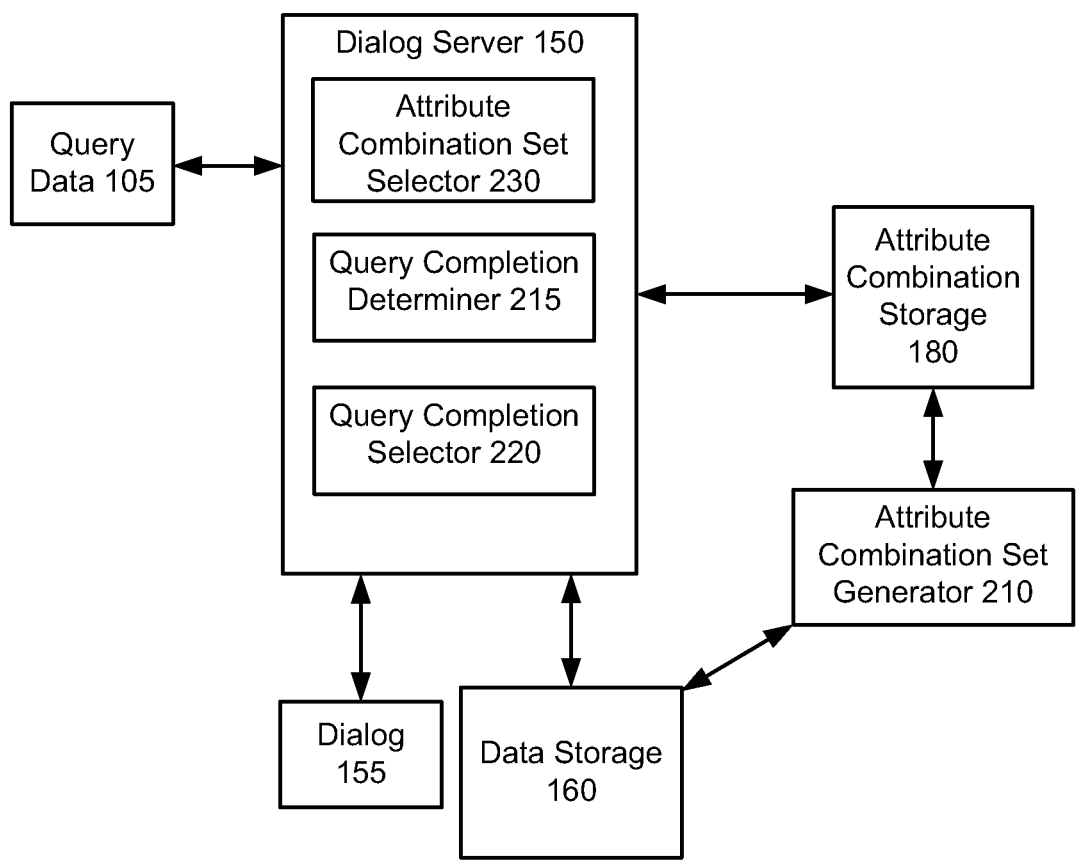
FIG. 2 is an illustration of an example dialog server.

FIG. 2 is an illustration of an example dialog server 150. As illustrated, the dialog server 150 includes several components including, but not limited to, an attribute combination set selector 230, a query completion determiner 215, and a query completion selector 220. More or fewer components may be supported by the dialog server 150. In addition, the dialog server 150 may be in communication with an attribute combination set generator 210.

The attribute combination set generator 210 may generate one or more sets of attribute combinations based on the data from the data storage 160 and may store the generated one or more sets of attribute combinations in the attribute combination storage 180. The one or more sets of attribute combinations may be generated by the attribute combination set generator 210 based on the attributes and attribute values of the data tuples from the data storage 160. Each set of attribute combinations may include one or more patterns, grammars, or rules that may be used to generate query completions. In addition, queries from a query or search log representing previously received queries may also be used by the attribute combination set generator 210 to generate the set of attribute combinations.

In some implementations, each set of attribute combinations may comprise a mapping from attributes and attribute values to query completions. Each combination of attribute and attribute values in the mapping may correspond to a data tuple from the data storage 160. The attribute combination set generator 210 may generate an entry in the mapping for each possible combination of attributes and attribute values for each data tuple. The entry may then be mapped to a query completion that may be used to query the data tuple. In other implementations, the set of attribute combinations may comprise a finite state transducer.

The attribute combination set generator 210 may further extend the generated sets of attribute combinations to include synonyms, misspellings, and/or other related words or phrases to one or more of the attributes and attribute values. These related words and phrases may be similarly mapped to the query completions corresponding to the data tuples.

The attribute combination set generator 210 may further associate probabilities or frequencies with the attribute combinations for each of the sets of attribute combinations. In some implementations, the frequencies may be based on the data in the data storage 160, or based on the frequency of previous queries received as part of a query log or search log, for example.

The attribute combination set selector 230 may select one or more sets of attribute combinations from the generated sets of attribute combinations in the attribute combination storage 180. In some implementations, the attribute combination set selector 230 may select the sets of attribute combinations according to the associated frequencies or probabilities. Other methods for selecting may be used such as random selection, or a combination of random selection and selection based on associated frequencies or probabilities.

The query completion determiner 215 may received query data 105 and determine a plurality of query completions based on the received query data 105 using one or more of the selected sets of attribute combinations. In implementations where the attribute combinations are mappings of attributes and attribute values to query completions, the query completion determiner 215 may determine the attributes and attribute values that match, or are partial matches, of the query data 105. For example, if the query data 105 is the string "di" the query completion determiner 215 may determine all attributes and/or attribute values that include the string "di" as matches or partial matches of the query data 105. The query completions that map to the attributes and/or attribute values that match or partially match the query data 105 may be determined as the plurality of query completions by the query completion determiner 215.

As may be appreciated, by using attribute combinations corresponding to data in the data storage 160, query completions may be generated by the query completion determiner 215 based on the actual attributes and attribute values from the data storage 160 rather than by simply matching query data 105 against previously received queries. For example, in previous systems some number of users may have submitted the query "12 megapixel Nikon camera". At a later time, when a user submits query data 105 including the partial query "12 megapixel", the previous systems would return query completions limited to the previously received queries such as "12 megapixel Nikon camera". In contrast, the query completion determiner 215 generates query suggestions based on attribute combinations, such as patterns and grammars, that were generated based on the data tuples from the data storage 160. Thus, for example, the query completion determiner 215 may use an attribute combination of "<megapixel> <brand>" to generate the query suggestions "10 megapixels Nikon" or "11 megapixels canon" based on the partial query "12 megapixel" even though a user may not have ever have submitted queries corresponding to the suggestions.

The query completion selector 220 may select a subset of the query completions to provide along with a dialog 155. In some implementations, the query completion selector 220 may select the query completions that correspond to the greatest number of data tuples from the data storage 160.

In another implementation, the query completion selector 220 may select the query completions using a search history or query logs associated with the dialog server 150. The query completion selector 220 may select the query completions that are most frequently selected or submitted by users according to the log, for example. Alternatively or additionally, the query completion selector 220 may determine a user associated with the query data 105 and may select the query completions using a search history or log associated with the determined user.

The query completion selector 220 may further select the query completions according to a diversity function. For example, rather than select only the most popular query completions, or only the query completions that match the greatest number of structured data tuples, the query completion selector 220 may additionally or alternatively select one or more less popular query completions, or query completions that do not match a large number of structured data tuples. In some implementations, the diversity function may take into account the query completions that were previously provided to the user in a previous dialog 155. For example, the query completion selector 220 may select query completions that were not previously presented to the user in a previous dialog 155.

Figure 3:
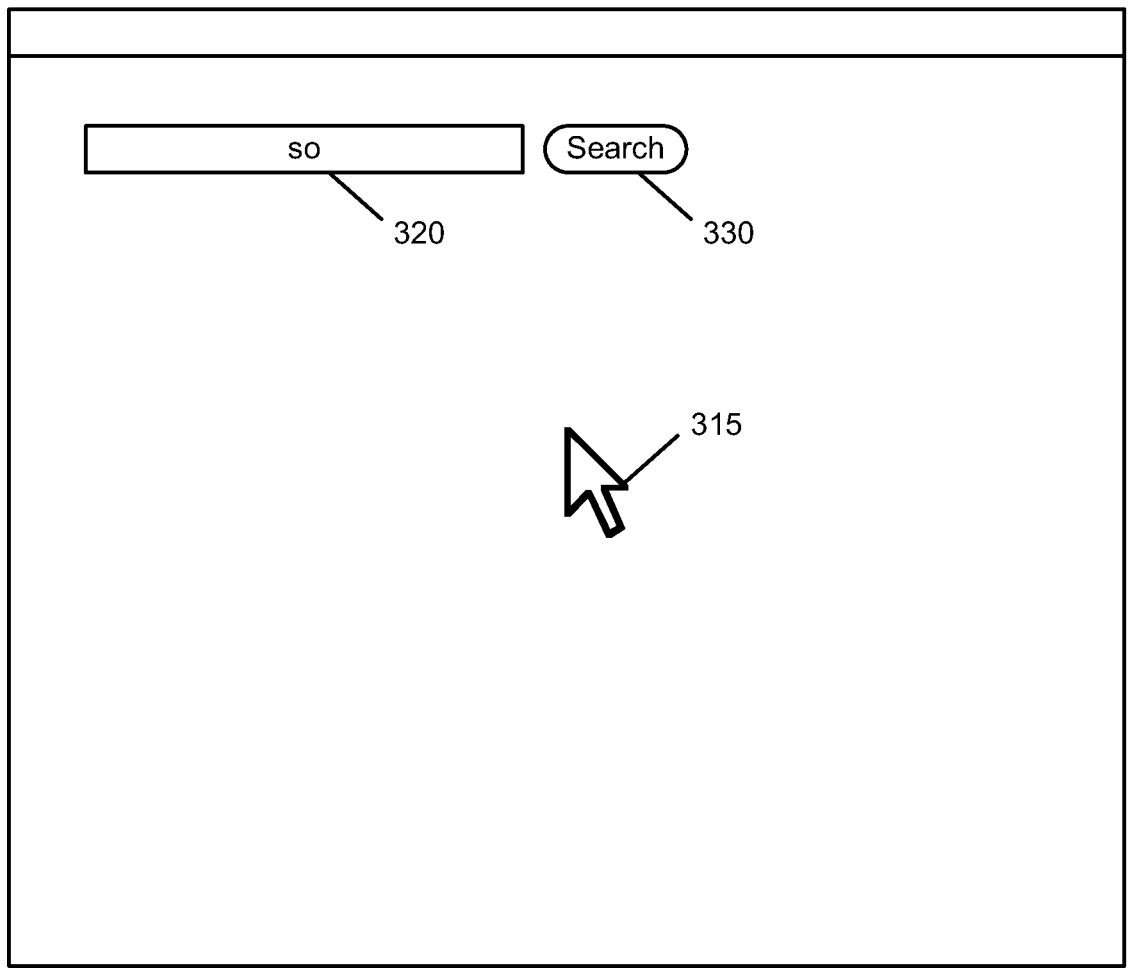
FIG. 3 is an illustration of an example user interface.

FIG. 3 is an illustration of an example user interface 300. The user interface 300 may be generated for a user by a web browser, or other application, executing at the client device 110. The user may enter text corresponding to a query into a text box 320 of the user interface 300. In an implementation, the user may submit the query entered into the text box 320 by selecting a button 330 (or similar indicator or selector) labeled "search" for example using a pointer 315. However, rather than having the user wait until they have submitted a complete query into the text box 320, the characters that the user has entered so far may be provided to the dialog server 150 as the query data 105.

As shown, the user has begun entering text into the text box 320 and has so far entered the string "so" into the text box 320. Accordingly, the string "so" is provided to the dialog server 150 as the query data 105. The query data 105 may be received by the dialog server 150 and used to generate a dialog 155 based on the query data 105 and a set of attribute combinations corresponding to the attributes and attribute values of the data tuples of the data storage 160. The dialog 155 may be provided to the client device 110 by the dialog server 150.

Figure 4:
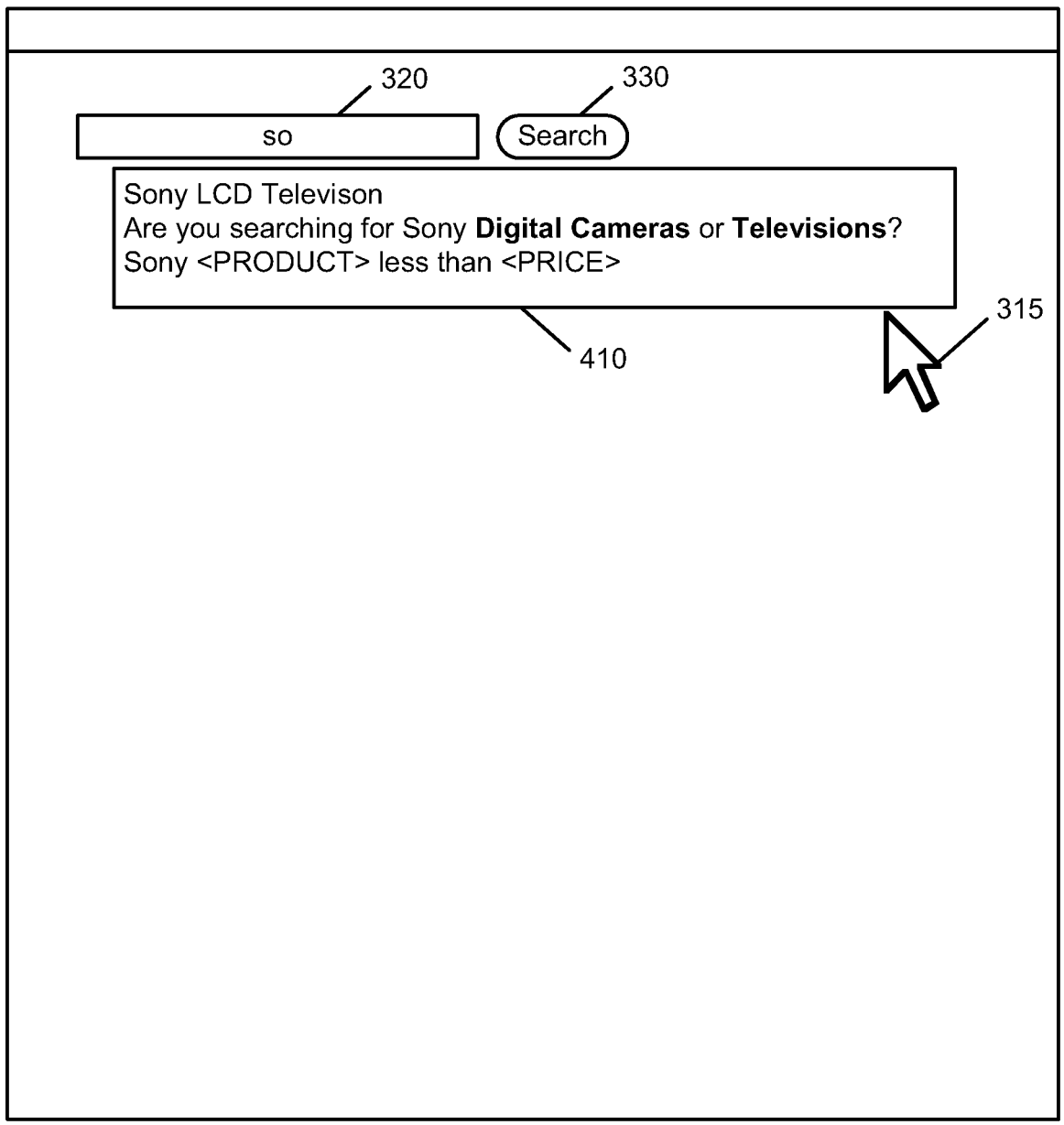
FIG. 4 is another illustration of an example user interface.

FIG. 4 is an illustration of the example user interface 300 updated to include the dialog 155 generated in response to the query data 105 entered by the user in the text box 320. In an implementation, the dialog 155 is displayed in the user interface 300 using a drop-down box 410, for example, displayed proximate to the text box 320. The user may use the pointer 315 to interact with one or more of the query completions displayed in the dialog 155.

In the example shown in FIG. 4, the dialog 155 displayed in the drop-down box 410 includes three query completions. The first query completion is "Sony LCD Television." This query completion may correspond to a query on the data tuples having the form <Brand=Sony, Product=Television, Type=LCD>. Thus, if the user selects the first query completion, the dialog server 150 may generate results 161 that identify one or more data tuples that are responsive to the query. Alternatively or additionally, if the user selects the first query completion, the dialog server 150 may update the dialog 155 to include additional attributes and attribute vales associated with Sony LCD Televisions. For example, the dialog 155 may ask the user to provide a price range or size for the Sony LCD Television. The first query completion is an example of a concrete query completion.

The second query completion shown in FIG. 4 is "Are you searching for Sony Digital Cameras or Televisions?" This query completion may correspond to two queries having the form <Brand=Sony, Product=Digital Camera> and <Brand=Sony, Product=Television>. The user may indicate the query that they are interested by selecting either the bolded term "Digital Cameras" or the bolded term "Televisions" using the pointer 315, for example. Depending on the term selected, the dialog server 150 may generate results 161 that identify one or more data tuples that are responsive to the corresponding query, or may update the dialog 155 to include query completions with additional attributes and attribute vales for the user to select. The second query completion is an example of an abstract query completion.

The third query completion displayed is "Sony <PRODUCT> less than <PRICE>". This query completion includes the tokens <PRODUCT> and <PRICE>. The user may select the tokens using the pointer 315 and may enter a value or range of values for each token. The dialog server 150 may then generate a query for the data tuples using the provided values or ranges of values. The dialog server 150 may generate results 161 that identify one or more data tuples that are responsive to the query, or may update the dialog 155 to include additional query completions for the user to select. The third query completion is another example of an abstract query completion.

Figure 5:
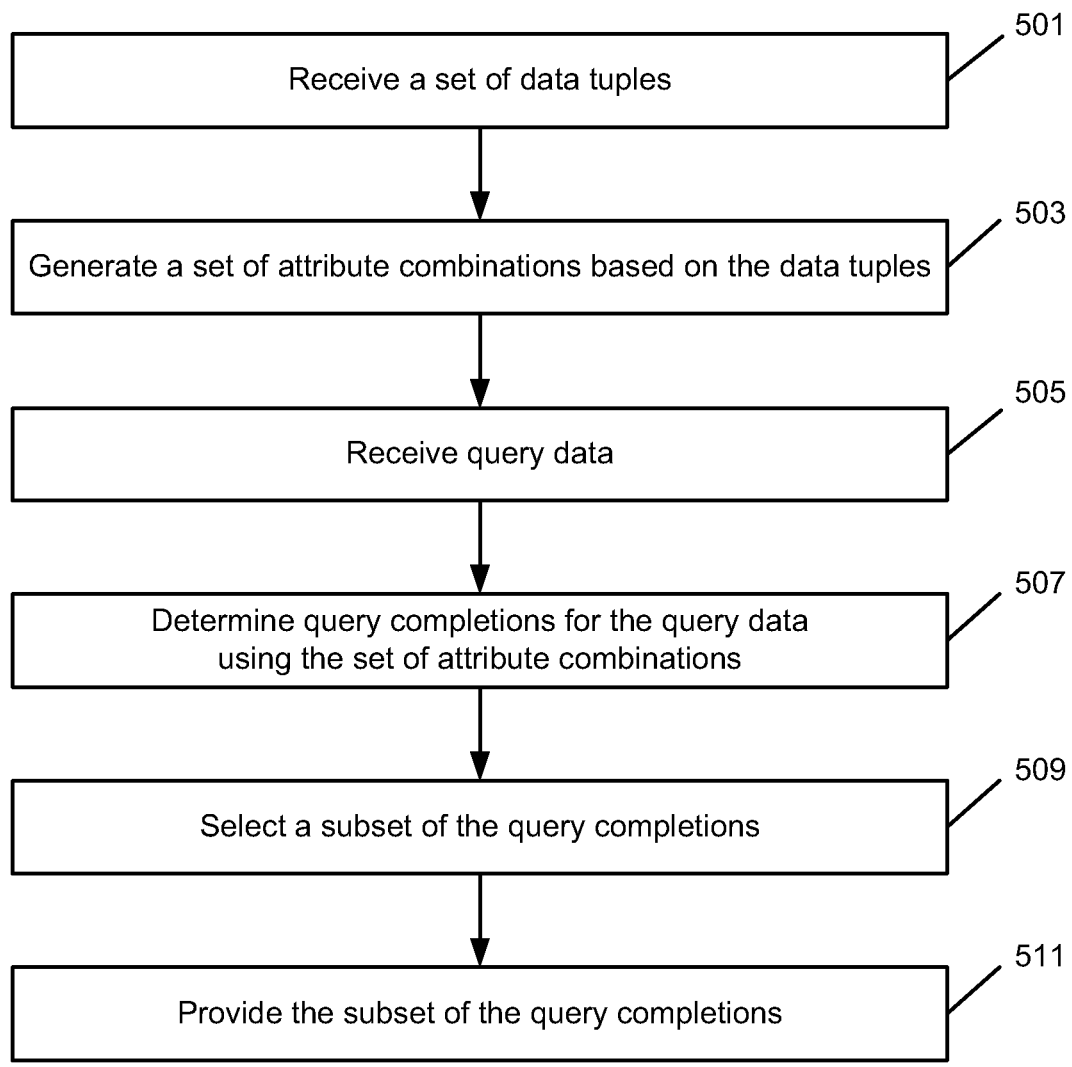
FIG. 5 is an operational flow of an implementation of a method for providing one or more query completions in response to query data.

FIG. 5 is an operational flow of an implementation of a method 500 for providing one or more query completions in response to query data. The method 500 may be implemented by the dialog server 150, for example.

A set of data tuples is received at 501. The set of data tuples may be received by the dialog server 150. The set of data tuples may be received from the data storage 160, and each data tuple may include multiple attributes and each attribute may have one or more attribute values. For example, each data tuple may represent a product and each attribute may have an attribute value corresponding to characteristics of the product. In another example, each data tuple may represent an airline flight and each attribute may have an attribute value corresponding to characteristics of the flight such as the origin, destination, or airline.

One or more sets of attribute combinations are generated based on the data tuples at 503. The sets of attribute combinations may include patterns and grammars, for example. The sets of attribute combinations may be generated by the attribute combination set generator 210 from the attributes and attribute values of the data tuples. In some implementations, the attribute combination set generator 210 may further use or consider previously received queries from a query or search log associated with the dialog server 150 when generating the sets of attribute combinations. Known synonyms and misspellings of the attribute and attribute values corresponding to the data tuples may also be considered by the attribute combination set generator 210.

The attribute combinations may be used to parse received query data and determine one or more possible query completions that correspond to the query data based on the data tuples. In some implementations, the attribute combinations may comprise a mapping of attributes and attribute values to query completions. For example, the sets of attribute combinations may comprise a set of strings or tokens representing valid queries for the data tuples based on the attributes and attribute values of the data tuples. The query completions may include abstract query completions and concrete query completions. In some implementations, the attribute combinations may be implemented using one or more finite state transducers.

Query data is received at 505. The query data may be received by the dialog server 150 from the client device 110. The query data may be a partial query and may include one or more characters of an intended query entered by a user.

A plurality of query completions are determined for the query data using the grammar at 507. The query completions may be determined by the query completion determiner 215 based on the query data and one or more selected sets of query completions. In some implementations, the query completions may be determined by determining one or more attributes or attribute values that are partial matches of the query data, and determining the plurality of query completions based on the mappings from the selected sets of query completions and the determined one or more attributes or attribute values that are partial matches.

A subset of the plurality of query completions is selected at 509. The subset of the plurality of query completions may be selected by the query completion selector 220. As described previously, depending on the number of data tuples and the query data, there may be thousands of possible query completions determined for the query data. Thus, the query completion selector 220 may select only a subset of the determined query completions to include in the dialog.

In some implementations, the subset of query completions may be selected using search or history data corresponding to the user associated with the query data. For example, the query completions which are most similar to the query data provided by the user in previous user sessions may be selected. In other implementations, the subset of query completions may be selected using history data associated with other users. For example, the most popular query completions may be selected, or the query completions corresponding to the most popular data tuples (e.g., most popular products) may be selected. In another implementation, the query completions may be selected using a diversity function. For example, the query completions may be selected to cover the broadest possible range of data tuples, or may be selected to include less popular query completions along with (or instead of) popular query completions.

The subset of the determined one or more query completions is provided at 511. The subset may be provided by the dialog server 150 to the client device 110. In some implementations, the subset may be provided as part of a dialog 155 in response to the received query data. The dialog 155 may be displayed to the user proximate to a user interface element where the user entered the query data, and the user may interact with the dialog 155 by selecting one or more of the query completions. Where the query completions are abstract query completions, the user may provide one or more values corresponding to one or more tokens of the abstract query completions.

Figure 6:
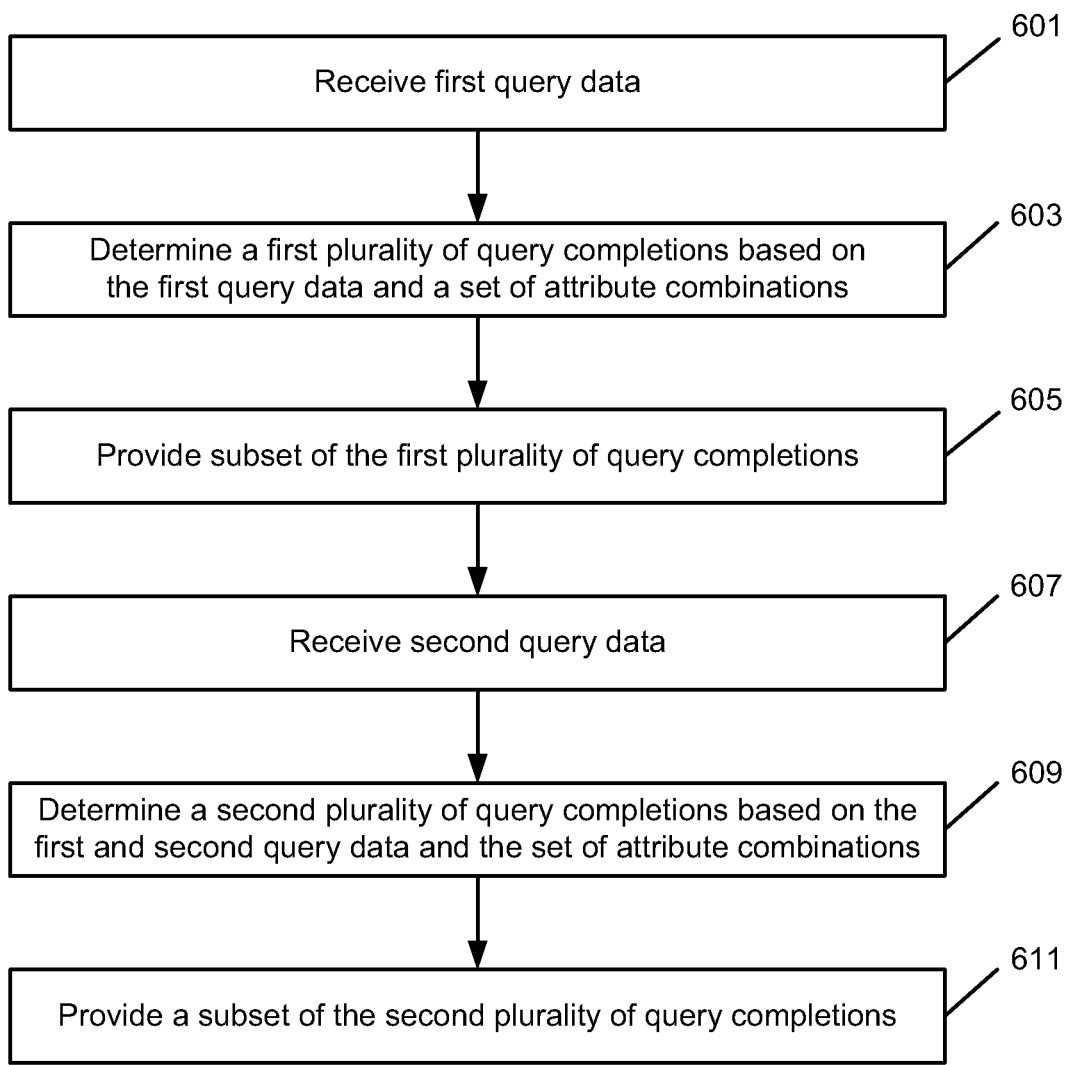
FIG. 6 is an operational flow of an implementation of a method for providing one or more query completions in response to first and second query data.

FIG. 6 is an operational flow of an implementation of a method 600 for providing one or more query completions in response to first and second query data. The method 600 may be implemented by the dialog server 150, for example.

A first query data is received at 601. The first query data may be received by the dialog server 150 from the client device 110. The first query data may be a partial query and may include one or more characters of an intended query entered by user. For example, the first query data may be the first one, two, or few characters of a query that the user intends to submit. However, rather than wait for the user to enter the full query, the characters of the query that the user has entered thus far are provided to the dialog server 150.

A first plurality of query completions is determined based on the first query data and a set of attribute combinations associated with a plurality of data tuples at 603. The first plurality of query completions may be determined by the query completion determiner 215. Each data tuple may include a plurality of attributes and each attribute may have one or more attribute values. The set of attribute combinations may include a mapping of attributes and attribute values to a plurality of query completions. The first plurality of query completions may be determined by the query completion determiner 215 by determining one or more attribute or attribute values from the data tuples that are partial matches of the first query data, and determining the first plurality of query completions based on the mapping from the attribute combinations and the determined one or more attribute or attribute values that are partial matches.

A subset of the first plurality of query completions is provided at 605. The subset may be provided to the client device 110 from the dialog server 150 as part of a dialog 155. The subset of the first plurality of query completion may have been selected by the query completion selector 220 from the plurality of query completions using a search history associated with a user who submitted the first query completion, or a diversity function, for example.

Second query data is received at 607. The second query data may be received at the dialog server 150 from the client device 110. In some implementations, the second query data may represent a selection of one or more of the subset of the first plurality of query completions provided in the dialog 155. Where the query completions are abstract query completions, the second query data may include values for one or more tokens of the abstract query completions.

A second plurality of query completions is determined at 609. The second plurality of query completions may be determined by the query completion determiner 215 based on the first query data, the second query data, and the set of attribute combinations.

A subset of the second plurality of query completions is provided at 611. The subset may be provided to the client device 110 from the dialog server 150 and used to update the dialog 155. The subset of the second plurality of query completions may have been selected by the query completion selector 220.

Figure 7:
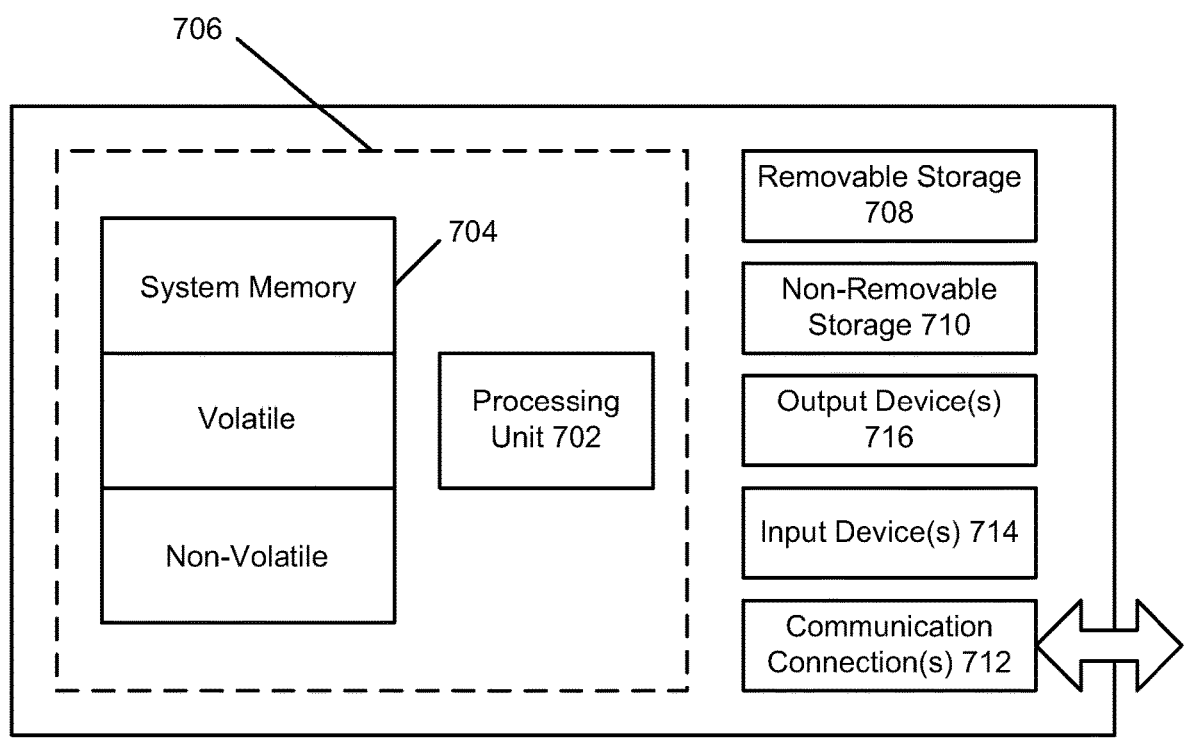
FIG. 7 shows an exemplary computing environment in which example embodiments and aspects may be implemented.

FIG. 7 shows an exemplary computing environment in which example embodiments and aspects may be implemented. An exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by computing device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving first query data at a computer system;
determining a first plurality of query completions based on the first query data and a set of attribute combinations associated with a plurality of data tuples by the computer system;
providing a subset of the first plurality of query completions by the computer system;
receiving second query data at the computer system;
determining a second plurality of query completions based on the first query data, the second query data, and the set of attribute combinations by the computer system, the data tuples representing items for which the computer system is configured to conduct computerized searches using one or more of the second plurality of query completions, and the set of attribute combinations comprising attributes of the items for which the computer system is configured to conduct computerized searches using one or more of the second plurality of query completions; and
providing a subset of the second plurality of query completions by the computer system.

2. The method of claim 1, wherein the subset of the first plurality of query completions and the subset of the second plurality of query completions are provided in a dialog, and further comprising providing additional subsets of query completions in the dialog in response to additionally received query data.

3. The method of claim 1, wherein each of the plurality of data tuples comprises a plurality of attributes, and each attribute has one or more attribute values, and the set of attribute combinations comprises a mapping of the attributes and the attribute values to a plurality of query completions, and wherein determining the first plurality of query completions for the received query data based on the first query data and the set of attribute combinations comprises:
determining one or more attributes or attribute values that are partial matches of the first query data; and
determining the first plurality of query completions based on the mapping and the determined one or more attributes or attribute values that are partial matches.

4. The method of claim 1, further comprising selecting the subset of the first plurality of query completions.

5. The method of claim 4, wherein selecting the subset of the first plurality of query completions comprises selecting the subset of the first plurality of query completions using a query log of previously received queries.

6. The method of claim 4, wherein selecting the subset of the first plurality of query completions comprises selecting the subset of the first plurality of query completions using a diversity function.

7. The method of claim 4, wherein selecting the subset of the first plurality of query completions comprises selecting the subset of the first plurality of query completions according to a popularity associated with each of the plurality of query completions.

8. The method of claim 1, wherein the first plurality of query completions and the second plurality of query completions comprise concrete query completions and abstract query completions, wherein the abstract query completions each include one or more tokens through which a user input may provide additional information requested by the query completion, and wherein the concrete query completions do not include tokens through which a user input may provide additional information requested by the query completion.

9. The method of claim 1, wherein at least one of the query completions of the first plurality of query completions includes a token, and the received second query data includes a value for the token.

10. A method comprising:
receiving a set of data tuples at a computer system, wherein each data tuple comprises a plurality of attributes and each attribute has one or more attribute values;
generating a set of attribute combinations based on the plurality of attributes and the corresponding one or more attribute values by the computer system;
receiving query data at the computer system;
determining a plurality of query completions for the query data using the set of attribute combinations by the computer system, the data tuples representing items for which the computer system is configured to conduct computerized searches using one or more of the plurality of query completions, and the plurality of attributes comprising attributes of the items for which the computer system is configured to conduct computerized searches using one or more of the plurality of query completions; and
providing a subset of the query completions by the computer system.

11. The method of claim 10, wherein the set of attribute combinations comprises a grammar.

12. The method of claim 11, wherein the grammar comprises a finite state transducer.

13. The method of claim 11, wherein the grammar comprises synonyms of the attributes and the attribute values.

14. The method of claim 11, wherein the grammar comprises misspellings of the attributes and the attribute values.

15. The method of claim 10, further comprising selecting the subset of the query completions.

16. The method of claim 15, wherein selecting the subset of the query completions comprises selecting the subset of the query completions using a query log of previously received queries.

17. The method of claim 15, wherein selecting the subset of the query completions comprises selecting the subset of the query completions using a diversity function.

18. A computer system comprising:
at least one processing unit; and
memory having instructions stored thereon that when executed by the at least one processing unit perform acts comprising:
receiving a set of data tuples, wherein each data tuple comprises a plurality of attributes and each attribute has one or more attribute values;
generating a set of attribute combinations based on the plurality of attributes and the corresponding one or more attribute values;
receiving query data;
determining a plurality of query completions for the query data using the set of attribute combinations, the data tuples representing items for which the computer system is configured to conduct computerized searches using one or more of the plurality of query completions, and the plurality of attributes comprising attributes of the items for which the computer system is configured to conduct computerized searches using one or more of the plurality of query completions; and
providing a subset of the determined plurality of query completions.

19. The computer system of claim 18, wherein the set of attribute combinations comprises a mapping of attributes and attribute values to a plurality of query completions, and the acts further comprise:
determining one or more attributes or attribute values that are partial matches of the query data; and
determining the plurality of query completions based on the mapping and the determined one or more attribute or attribute values that are partial matches.

20. The computer system of claim 18, wherein the set of attribute combinations further comprises misspellings of the attributes and the attribute values.

* * * * *